July 8, 1952        A. J. LEWIS        2,602,341
REVERSING DRIVE
Filed June 3, 1948        2 SHEETS—SHEET 1
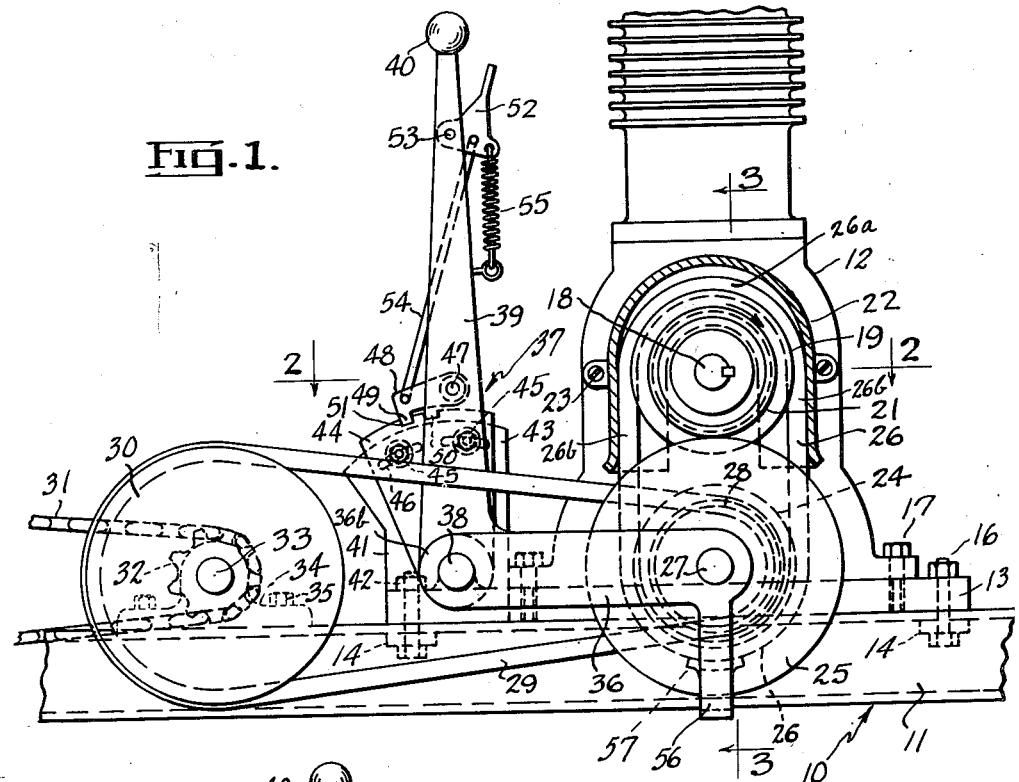
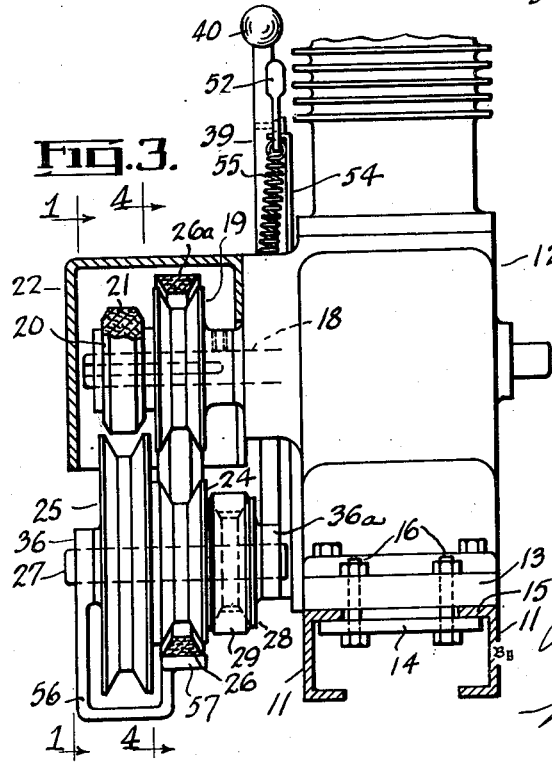
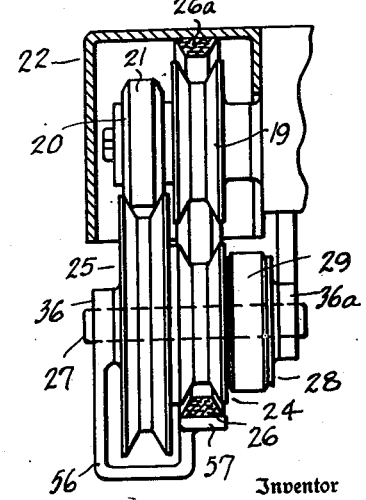
Inventor
Arthur J. Lewis
Wooster & Davis Attorneys July 8, 1952 — A. J. LEWIS — 2,602,341
REVERSING DRIVE
Filed June 3, 1948 — 2 SHEETS—SHEET 2

Inventor
Arthur J. Lewis
By Wooster & Davis Attorneys

Patented July 8, 1952

2,602,341

UNITED STATES PATENT OFFICE 2,602,341

REVERSING DRIVE

Arthur J. Lewis, Stratford, Conn., assignor to The Baird Machine Company, Stratford, Conn., a corporation of Connecticut Application June 3, 1948, Serial No. 30,772

10 Claims. (Cl. 74—220)

This invention relates to a drive mechanism for such devices as farm tractors and the like, and has for an object to provide a simple and effective drive means for this type of machine, which can be placed in the neutral or nondriving position, or in either the forward driving or rearward reversing position by simple movements of a hand lever.

It is also an object to provide a drive of this character including a belt driving element in which in the neutral or nondriving position and also in the reversing drive position there is no drag of the belt on either the driving or driven pulley, but it is entirely free of these pulleys.

A further object is to provide a construction and arrangement for this type of drive in which adjustment of the shifting pulley elements in changing between forward or reversing driving positions will not vary the length or tightness of the driving belt from this drive to the driving means for the traction wheels of the tractor.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a partial side elevation and partial section of the device applied to a tractor, showing the drive in the neutral or nondriving position, the plane of the section being on substantially the line 1—1 of Fig. 3;

Fig. 3 is a partial end view and partial vertical section looking from the right of Fig. 1, the plane of the section being substantially on the line 3—3 of Fig. 1, and the members of the drive being shown in neutral or nondriving position;

Fig. 6 is a vertical detail section substantially on the plane of the line 6—6 of Fig. 5.

Figure 2:
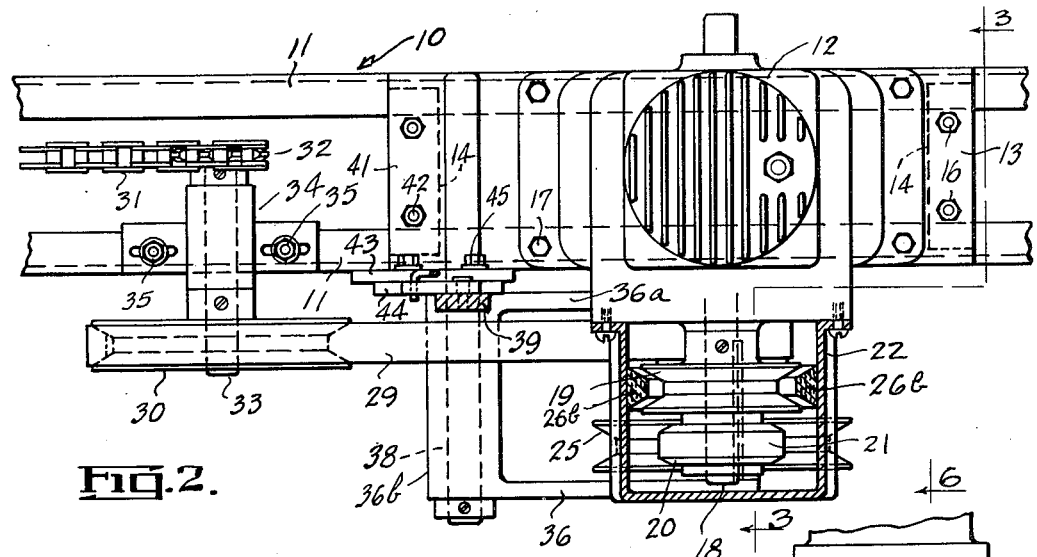
Fig. 2 is a partial top plan view and partial horizontal section, the plane of the section being substantially on the line 2—2 of Fig. 1.

A portion of the frame of a tractor is indicated at 10, comprising a pair of longitudinal laterally spaced channel members 11 on which is mounted the internal combustion motor 12 and the driving mechanism therefrom to the rear wheels of the tractor. The motor is mounted on a block or plate 13 mounted on the top of the channel members 11 so that it may be adjusted longitudinally of these members to adjust the position of the motor and to adjust the tightness of the drive belt, as will later be described.

For this purpose, at each end of the block or plate 13 is a transverse clamping bar 14 at the under sides of the upper flanges 15 of the channel members of the frame and connected by the bolts 16 and 42 to the block 13. By loosening these bolts the motor may be adjusted to the desired position on the frame members 11 and then secured in this position by tightening these bolts. The base of the motor is secured to the member 13 by any suitable means, such as the bolts 17.

Figure 5:
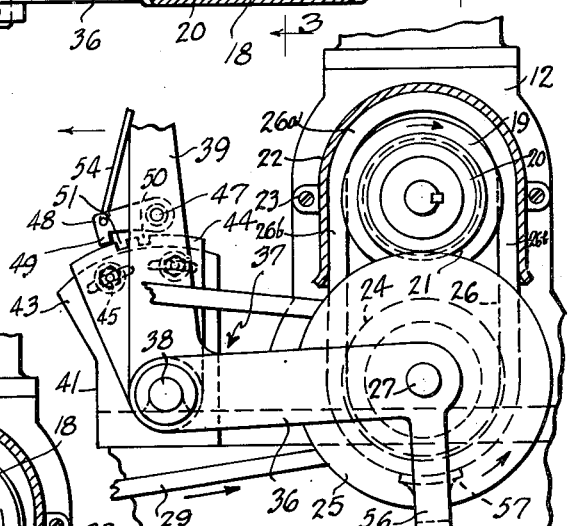
Fig. 5 is a partial side elevation and partial section in substantially the same plane as Fig. 1, but showing the drive mechanism in the reversing driving position.
Figure 4:
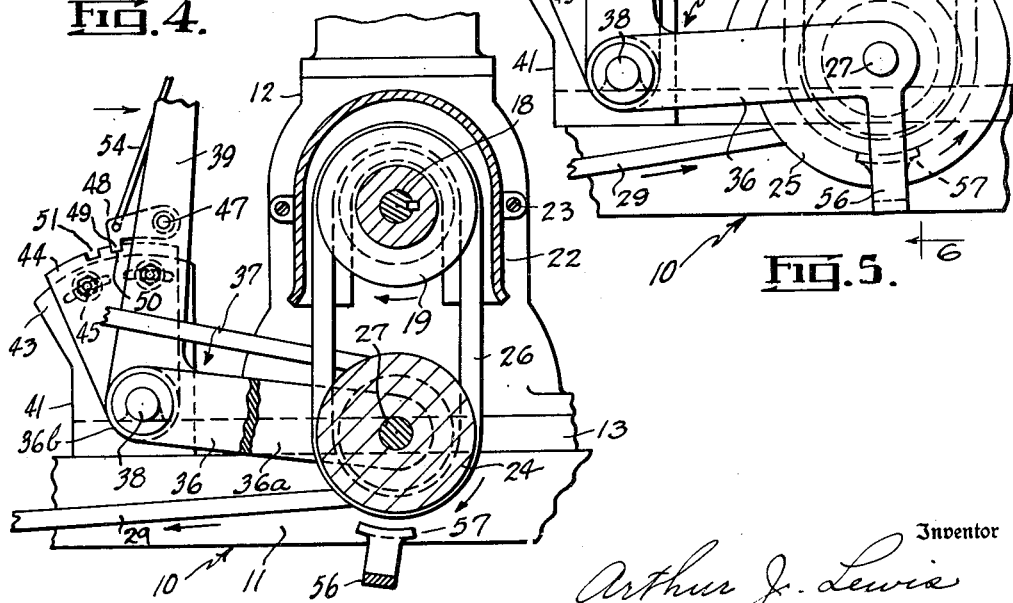
Fig. 4 is a detail vertical section showing the elements of the drive in the forward driving position, the plane of the section being substantially on the line 4—4 of Fig. 3.

The drive shaft of the motor is indicated at 18, and secured to this shaft are the two drive wheels 19 and 20, and in the arrangement shown they are driven clockwise, as viewed in Figs. 1, 4 and 5, as indicated by the arrows, the wheel 19 being a grooved pulley and the wheel 20 being a friction wheel including a driving element 21 of any suitable friction material, preferably of compressed fibre. These wheels are enclosed by a suitable protecting housing 22 mounted on the frame of the motor by any suitable means, such as the screws 23.

Mounted below these two wheels and in alignment with them are the two grooved pulleys 24 and 25, the pulley 24 being in alignment with the pulley 19 and the pulley 25 in alignment with the friction wheel 20. The pulley 24 is driven from the pulley 19 by the V belt 26, and the pulley 25 is driven by the friction wheel 20 when moved into engagement with it. The pulleys 24 and 25 are mounted on a suitable shaft 27, and also mounted on this shaft is a drive pulley 28 connected with and driven by these pulleys 24 and 25 and connected by a driving means, such, for example as a belt 29 to a pulley 30 on the frame 10, or a chain running over suitable sprockets, and connected by any suitable drive means, such, for example, as a chain drive 31, to a suitable drive mechanism (not shown) connected with the rear axle of the tractor for driving the rear wheels of this tractor, this chain 31 being operated by a suitable sprocket 32 secured to the shaft 33 on which the pulley 30 is also secured.

The shaft may be mounted by any suitable means, such as the bearing 34 mounted for longitudinal adjustment on the frame by the securing bolts 35.

The shaft 27 and the pulleys 24, 25 and 28 are mounted on the laterally spaced arms 36 and 36a of a bell crank lever 37 pivotally mounted on the frame of the machine on the shaft 38, these arms being connected by the bearing sleeve 36b on the shaft, the other arm 39 of the bell crank being an upright hand lever provided with a suitable hand grip 40 at its upper end. The shaft 38 and the bell crank 37 are mounted on the frame 10 of the machine by any suitable means, such as the bracket 41, which is secured by any suitable means, such as the clamping bolts 42, to the adjustable plate or block 13 on which the motor is mounted, so that this bracket and the parts carried thereby will be adjusted with the motor. The bracket 41 includes an upward extension 43 at one side of which is adjustably mounted a sector plate 44, this plate being at its lower end pivoted on the shaft 38 and adjustable about this shaft to various angular positions. It carries a pair of clamping bolts 45 extending through curved elongated slots 46 in the plate 43 to secure the plate 44 in different adjusting positions. Pivotally mounted on the hand lever 39 at the point 47 is a pawl 48 having a lug 49 at its free end adapted to seat in either of the notches 50 or 51 in the upper edge of the sector plate 44, to thus hold the hand lever 39 and the pulleys 24, 25 and 28 in either of two positions. The pawl may be released by a hand lever 52 pivoted to the lever 39 at 53 and connected with the pawl by a link or rod 54. A spring 55 tends to swing the pawl 48 downwardly to retain it in the holding position.

The arms 36 and 36a extend substantially horizontally from their pivot shaft 38 and carry the shaft 27 and the pulley wheels 24, 25 and 28 at their free ends, so that by swinging the hand lever 39 forwardly or backwardly these pulley wheels may be raised or lowered to control operation of the drive. At the free end of one of these arms, in this case the arm 36, there is a downward extension or arm 56 which extends rearwardly under the rim of the pulley wheel 25 and is provided with a shoe 57 under the short drive belt 26 operating between the pulley wheels 19 and 24. This is arranged so that in the neutral or nondriving position, this shoe 57 engages the lower side of the belt 26 to support this belt out of engagement with either of the pulleys 19 or 24, as will presently be described.

The operation is as follows: When the bell crank lever 37 is in the intermediate position of Figs. 1, 2 and 3, it is in the neutral or nondriving position. In this position the belt 26 running between the pulleys 19 and 24 is loose, so that there is no driving action from the pulley 19 to the pulley 24, and the motor can run without driving the tractor. In this position, as shown in Fig. 1, the lower side of the belt rests on the shoe 57 of the extension 56 of the outer horizontal arm 36 of the bell crank lever, and the belt has sufficient rigidity or stiffness so that it is raised by this shoe to the position of Figs. 1, 2 and 3, and raises the upper curved portion 26a of the belt off the pulley 19 so that there is no friction or drag from this pulley to the belt in this position. The belt also has a tendency to flare outwardly due to the inherent resiliency of the material in the belt, so that the side runs 26b of the belt engage and are held from spreading further by the side walls of the housing 22. Therefore, any lift on the belt from the shoe 57, because the belt cannot spread laterally, will lift the upper part 26a of the belt away from the drive pulley 19, and therefore the coaction of the shoe 57 and the housing retains the belt in this position and there is no drag or friction between the belt and the drive pulley when the pulleys 24 and 25 are in the intermediate or neutral position. The movement of the pulleys to this position also raises the lower or driven pulley 24 away from the belt, as shown in Fig. 3. They are held in this position by the lug 49 and the pawl 48 seating in the notch 51 of the ratchet sector 44.

If it is desired to drive the tractor forwardly, all the operator does is to swing the hand lever 39 forwardly or to the right as viewed in Fig. 1, to the position of Fig. 4. This swings the pulleys 24 and 25 downwardly, tightening the drive belt 26 between the drive pulley 19 and the driven pulley 24, so that pulley 24 is driven in the same direction as the pulley 19. As driving the pulley 24 also drives the drive pulley 28, it will operate through the belt 29 to drive the pulley 30 and from this pulley through the chain 31 to the drive of the rear axle and the tractor wheels. The drive will be held in this position by the lug 49 on the pawl 48 seating in the notch 50 of the ratchet sector 44. By adjusting this sector about the shaft 38, the tightness of the belt 26 in this driving position may be adjusted. The sector may be held in this position by the clamping bolts 45.

When it is desired to reverse the drive or drive the tractor backwardly, the operator swings the hand lever 39 backwardly or to the left as viewed in Figs. 1, 4 and 5, to the position of Fig. 5. This will swing the arms 36 and 36a of the bell crank lever upwardly, carrying with them the pulleys 24 and 25. This action will release the belt 26, but will bring pulley 25 into engagement with the frictional drive element 21 of the frictional drive wheel 20, as shown in Figs. 5 and 6. As the wheel 20 is rotating clockwise or to the right as viewed in Fig. 5, this will rotate the pulley 25 to the left or counterclockwise, and will drive the pulley 28 in the opposite direction from that of the drive belt 26. This, of course, reverses the direction of operation of the drive belt 29, rotating the pulley 30 in the opposite direction and reversing the drive of the tractor. If desired, a notch could be provided in the sector 44 to cooperate with the pawl 48 to hold the drive in this position, but as a tractor is ordinarily driven only a short time in reverse, such notches are ordinarly omitted, and the drive is held in this position by the operator. When the pulleys 24 and 25 were swung upwardly to this reversing position, the forward drive belt 26 was released and its lower side was engaged by shoe 57 on the extension 56 of the bell crank arm 36, thus shifting the belt upwardly away from the drive pulley 19, as shown in Figs. 5 and 6, and as previously described in connection with the intermediate or neutral driving position. The belt 10 tends to expand when released so that the side runs 26b are held against the side walls of the housing 22. The upper curved portion 26a also retains its shape and is lifted from the drive pulley 19 to the position of Figs. 5 and 6, with this upper portion conforming to the curved inside of the top wall of the housing. The supporting shoe 57 is so positioned that in the intermediate position of Figs. 1, 2 and 3, the lower curved portion of the belt is spaced below the lower driven pulley 24 and out of contact with it, as shown in Fig. 3. Also in the reversing position of Figs. 5 and 6, this lower curved portion is spaced from the pulley 24, as indicated in Fig. 6. Thus in the intermediate or neutral position and in the reversing position, the forward drive belt 26 is held spaced from both the drive pulley 19 and the driven pulley 24, so that either one may rotate without any drag or friction on the belt, and therefore without any wear on the belt or pulleys while in these positions, and without any tendency of a creeping drive while in these positions.

It will be evident from Fig. 1 that the pivot 38 for the bell crank lever 37 is located between the upper and lower runs of the drive belt 29 from this drive mechanism to the tractor drive, and it is also preferably located substantially on the same level as the shaft 33 with the intermediate position of the shaft 27 in the same plane or level. Therefore, when swinging the pulleys 24 and 25 in shifting them to the three positions, movement of the shaft 27 is on an arc with the axis of the shaft 38 as a center. These movements are relatively small and therefore movement of the shaft 27 is in an arc very closely the same as an arc struck about the axis of shaft 33 as a center. Therefore, shifting of the pulley 28 between the various drive positions causes no appreciable change in the distance between the shafts 27 and 33 and therefore causes no appreciable change in the tension or tightness of the belt 29. However, the tension or tightness of this belt 29 may be adjusted by shifting the plate or block 33 carrying the motor and the bell crank lever 37 toward and from the pulley 30. The position of the pulley 30 may also be adjusted to vary the tightness of the chain drive 31.

It will be apparent from the above that this drive is a very simple one and involves a minimum number of parts; that it is also very simple to operate, as a simple movement of the hand lever forwardly places it in the forward driving position and a similar movement in the opposite direction places it in the reversed position, while a partial movement from either one of these positions places it in the neutral or intermediate position, so that it will not drive the tractor in either direction.

It has been found that by locating the friction element 21 on the driving wheel 20 of the two wheels of the friction drive there is much less wear on the elements, and particularly the nonmetallic element, than where it is located on the driven element.

Having thus set forth the nature of my invention, I claim:

1. A drive mechanism for tractors and the like comprising a drive shaft and a pair of wheels secured to this shaft including a belt pulley and a friction drive wheel, a pivoted bell crank lever including a substantially horizontal arm, a hand lever for swinging said arm in an upright plane, belt and friction pulleys mounted on the arm in alignment respectively with the first pulley and the drive wheel and shiftable toward and from them by operation of the hand lever, an operative belt running over the first pulley and its aligned pulley on the bell crank lever, a drive pulley on the crank arm connected with the pulleys on this arm and driven thereby, a driven pulley, a belt running from the drive to the driven pulley comprising upper and lower spaced runs, and the pivot for the crank arm being located between the driving and driven pulleys and intermediate the upper and lower runs of the belt on said pulleys.

2. A drive mechanism for tractors and the like comprising a drive shaft and a pair of wheels secured to this shaft including a belt pulley and a friction drive wheel, a pivoted bell crank lever including a substantially horizontal arm and a hand lever for swinging said arm about its pivot, belt and friction pulleys mounted on said arm in alignment respectively with the first pulley and the drive wheel and shiftable toward and from them by operation of the hand lever, an operative belt connecting the first pulley and its aligned pulley on the lever arm, a drive pulley on this latter arm connected with the pulleys on this arm and driven thereby, a driven pulley on the opposite side of the pivot for the bell crank lever from the driving pulley, a driving belt connecting the driving and driven pulleys and comprising upper and lower spaced portions extending between the pulleys, and the pivot for the bell crank lever being located between said upper and lower portions of the driving belt and substantially on the level of the axes of the driving and driven pulleys.

3. A drive mechanism for tractors and the like comprising a drive shaft and a pair of wheels secured to this shaft including a belt pulley and a friction drive wheel including a rim element of nonmetallic friction material having tapered side walls, a pair of driven belt and friction pulleys mounted in alignment respectively with the first pulley and the drive wheel, an operative belt connecting the first pulley and its aligned driven pulley, the second driven pulley having a grooved rim with tapered side walls substantially corresponding with those of the rim element of the friction drive wheel, means for shifting the driven pulleys toward and from the driving pulley and friction wheel to contact the friction wheel and its driven pulley or render the belt effective, and a driving pulley connected with and operated by said driven pulleys.

4. A drive mechanism for tractors and the like comprising a motor and a pair of wheels driven thereby including a belt pulley and a friction drive wheel, a pair of driven belt and friction pulleys mounted below said wheels in alignment respectively with the first pulley and the drive wheel, the drive wheel and its aligned pulley when in engagement forming a friction drive, an operative belt connecting the first pulley and its aligned driven pulley and having sufficient inherent stiffness to maintain its looped shape and tend to shift it away from the pulleys, a stationary housing extending about the first pulley and spaced outwardly therefrom to limit outward movement of the belt away from the pulley, means for raising and lowering the driven pulleys to render the friction drive or the belt drive effective, and a support for the belt movable with the driven pulleys and positioned to engage the lower portion of the belt when the driven pulleys are raised and bodily lift the entire belt and support it out of engagement with the first pulley and against the housing.

5. A drive mechanism of the character described comprising a pair of drive wheels including a grooved drive pulley and a friction wheel, a stationary housing over the grooved pulley and spaced outwardly therefrom, a pair of driven pulleys mounted below said wheels, one of said latter pulleys being adapted to engage the friction wheel for a friction drive and the other being a grooved pulley in alignment with the first pulley, a tapered belt connecting the grooved pulleys and having sufficient inherent stiffness to retain its looped shape and tend to expand it outwardly away from the pulleys, means for shifting the driven pulleys toward and from the drive wheels to render either the friction or belt drive effective and ineffective, and a support movable with the driven pulleys positioned to engage the under side of the belt and bodily lift and hold it out of engagement with its pulleys and against the housing when the belt drive is ineffective.

6. A drive mechanism for tractors and the like comprising a motor and a pair of wheels driven thereby including a belt pulley and a friction drive wheel, a stationary housing over the pulley and spaced outwardly therefrom, a pivoted bell crank lever including a substantially horizontal arm, a pair of driven pulleys mounted on said arm below said wheels, one of said latter pulleys being adapted to engage the friction wheel for a friction drive and the other being a belt pulley in alignment with the first pulley, a drive belt connecting the first and latter pulleys and having sufficient inherent stiffness to maintain its looped shape and tend to expand it outwardly away from the pulleys, a hand lever for swinging said arm to shift the driven pulleys toward and from the said wheels to render the friction drive and belt drives alternately effective and ineffective, an extension depending from said arm, a support on said extension positioned to engage the lower side of the belt to lift it bodily and support it free of its pulleys and against the housing when the driven pulleys are raised to render the belt drive ineffective, and a drive means operated by the driven pulleys.

7. A drive mechanism for tractors and the like comprising a motor and a pair of wheels driven thereby including a belt pulley and a friction drive wheel, a stationary housing over the belt pulley and spaced outwardly therefrom, a pivoted bell crank lever including a substantially horizontal arm and a hand lever for swinging said arm about its pivot, pulleys mounted on said arm in alignment respectively with the first pulley and the drive wheel and shiftable toward and from them by operation of the hand lever, one driven pulley adapted to engage the drive wheel when raised to provide a friction drive between them, a drive belt connecting the first pulley and the second driven pulley for driving connection when the driven pulleys are in their lower position, and a support on the lever arm movable with the driven pulleys and positioned to engage the lower side of the belt to lift it bodily and support it out of engagement with its pulleys and against the housing when the driven pulleys are raised above the belt driving position.

8. A drive mechanism of the character described comprising a drive pulley and a driven pulley under the driving pulley, a stationary housing over the drive pulley and spaced outwardly therefrom, a drive belt connecting the pulleys having sufficient inherent resilience and stiffness to retain its looped shape and expand outwardly away from the pulleys when released, means for raising and lowering the driven pulley to tighten and release the belt, a support movable with the driven pulley positioned to engage under the lower part of the belt when the lower pulley is raised to releasing position to bodily lift and support the belt out of contact with the pulleys and against the housing, and said housing including limit guides on opposite sides of the belt to limit lateral spread of the belt when in this position.

9. A drive mechanism for tractors and the like comprising a motor and a pair of wheels driven thereby including a grooved pulley and a friction wheel, a pair of connected driven pulleys mounted below said wheels including a pulley adapted to engage the friction wheel to be driven thereby and a grooved pulley in alignment with the first pulley, a tapered drive belt connecting the two grooved pulleys and having sufficient inherent resiliency and stiffness to retain its looped shape and expand outwardly away from the pulleys when released, means for raising and lowering the driven pulleys toward and from the said wheels to render the friction and belt drives alternately effective and ineffective, a support movable with the driven pulleys positioned to engage the under side of the belt and lift it bodily when the pulleys are raised to support the belt out of engagement with the pulleys when the belt is released, a stationary casing enclosing the first pulley and the top portion of the belt and restraining lateral expanding of the belt at its top and sides when the belt is in its released position, and driving means operated by the driven pulleys.

10. In a device of the character described, a supporting frame including laterally spaced upright side members provided with opposed inwardly extending longitudinal flanges along their upper edges, the free edges of the flanges being laterally spaced, a driven pulley mounted on said frame, a motor including a base supported on top of and bridging said side members and shiftable longitudinally thereon, a drive connection from the motor to the driven pulley including a driving pulley and a belt connecting the pulleys, said driving pulley being shiftable with the motor to vary the tension of the belt, a pair of separate straps spaced longitudinally of the motor base and side members of the frame so as to be located one adjacent each end of the base and each extending transversely between and bridging the flanges with its opposite ends engaged under the respective flanges of the spaced side members, and clamping bolts connecting the motor base and said straps to clamp the base and straps on opposite sides of the flanges to secure the motor in adjusted positions.

ARTHUR J. LEWIS.

REFERENCES CITED

The following references are of record in the file of this patent:

UNITED STATES PATENTS

| Number | Name | Date |
|---|---|---|
| 783,037 | Herby | Feb. 21, 1905 |
| 1,188,242 | Branfield | June 20, 1916 |
| 1,511,336 | Hoey | Oct. 14, 1924 |
| 1,978,526 | Eppler, Jr. | Oct. 30, 1934 |
| 2,272,981 | Nelson | Feb. 10, 1942 |
| 2,458,255 | Couse | Jan. 4, 1949 |